(12) United States Patent
Ishii et al.

(10) Patent No.: US 7,971,937 B2
(45) Date of Patent: Jul. 5, 2011

(54) SEAT ADJUSTER ASSEMBLY (75) Inventors: Yoshinori Ishii, Plymouth, MI (US); Zhi Song Wang, Shenzhen (CN)

(73) Assignee: Johnson Electric S.A., La Chaux-De-Fonds (CH)

( * ) Notice: Subject to any disclaimer, the term of this patent is extended or adjusted under 35 U.S.C. 154(b) by 262 days.

(21) Appl. No.: 12/372,519

(22) Filed: Feb. 17, 2009

(65) Prior Publication Data
US 2009/0206644 A1 Aug. 20, 2009

Related U.S. Application Data (60) Provisional application No. 61/034,000, filed on Mar. 5, 2008.

(30) Foreign Application Priority Data

Feb. 14, 2008 (CN) .......................... 2008 1 0066076

(51) Int. Cl.
*B60N 2/02* (2006.01)
*A47C 1/00* (2006.01)
(52) U.S. Cl. .................................. 297/330; 297/344.17
(58) Field of Classification Search ............. 297/344.15, 297/344.17; 74/425, DIG. 10, 89.23
See application file for complete search history.

(56) References Cited

U.S. PATENT DOCUMENTS

| 3,304,772 A | * | 2/1967 | Campbell | 73/862.22 |
|---|---|---|---|---|
| 4,966,045 A | * | 10/1990 | Harney | 74/424.96 |
| 5,015,035 A | * | 5/1991 | Stoeckl et al. | 297/344.17 |
| 5,695,248 A | * | 12/1997 | Bell | 297/344.17 |
| 6,352,006 B1 | * | 3/2002 | Kurashita | 74/409 |
| 6,578,920 B2 | * | 6/2003 | Delmas et al. | 297/344.17 |
| 2006/0236541 A1 | * | 10/2006 | Prucher | 29/893.34 |

FOREIGN PATENT DOCUMENTS

| CN | 2243575 Y | 12/1996 |
|---|---|---|
| CN | 2486784 Y | 4/2002 |
| CN | 2509936 Y | 9/2002 |
| CN | 2763526 Y | 3/2006 |

* cited by examiner

*Primary Examiner* — Sarah B McPartlin
(74) *Attorney, Agent, or Firm* — Martin Fleit; Paul D. Bianco; Fleit Gibbons Gutman Bongini & Bianco PL (57) ABSTRACT

A seat adjuster assembly includes an electric motor having an output shaft with a worm gear positioned in a gearbox, a spur gear meshing with the worm gear in the gearbox, a spindle shaft fixed to and driven by the spur gear coacting with a nut contained in a tube, and a linkage system connected to both a vertically movable upper vehicle seat part and a non-vertically movable lower vehicle seat part that positions vertically the upper vehicle seat part responsive to the position of the nut relative to the spindle shaft. At least one washer is provided on the spindle shaft. The spur gear is a plastic spur gear molded over the washer. A pair of leaf springs disposed in the gearbox bears against the spur gear and a wall of the gearbox.

25 Claims, 12 Drawing Sheets

SEAT ADJUSTER ASSEMBLY

CROSS REFERENCE TO RELATED APPLICATIONS

This non-provisional patent application claims priority under 35 U.S.C. §119(a) from Patent Application No. 200810066076.9 filed in The People's Republic of China on Feb. 14, 2008 and from Patent Application No. 61/034,000 filed in USA on Mar. 5, 2008, the disclosure of each is incorporated herein by reference.

FIELD OF THE INVENTION

The present invention relates to a seat adjuster assembly and in particular to a motor assembly thereof.

BACKGROUND OF THE INVENTION

To fit different people, an automobile usually has a seat adjuster assembly which comprises a motor driving a spindle shaft via a gearbox. The spindle shaft has outer threads engaging with inner threads of a nut contained in a tube which in turn is connected to a linkage connected respectively to a vertically movable upper part of a vehicle seat and a non-vertically movable lower part of the vehicle seat to cause the seat to move up or down under the control of a passenger occupying that seat to obtain a comfortable position. The lower part of the vehicle seat is usually slidingly mounted in guide rails fixed to the vehicle frame so that the seat can be positioned fore and aft.

Usually, the gearbox comprises a worm gear mounted on the output shaft of the motor and a spur gear meshing with the worm gear. The spur gear is made of plastic and directly molded to the spindle shaft. However, the plastic spur gear cannot withstand a large axial force by itself and is easily destroyed by a large axial force imposed on the spindle shaft, as would occur in the event of a crash or accident.

SUMMARY OF THE INVENTION

The main object of the present invention is to improve the design and structure of a seat adjuster assembly which can solve the above problems or which can reduce axial play in the motor sub-assembly.

The illustrated embodiments of the present invention have the beneficial effects of increasing the axial pull off force between the spur gear and the spindle shaft by using washers between the spur gear and the spindle shaft. Thus the present invention can greatly improve the security of the system in a simple manner.

Accordingly, in one aspect thereof, the present invention provides a seat adjuster assembly for adjusting a vertically movable upper vehicle seat part relative to a non-vertically movable lower vehicle seat part, the seat adjuster assembly comprising: an electric motor comprising an output shaft with a worm gear positioned in a gearbox; a spindle shaft providing first threads; a spur gear fixed to the spindle shaft, the spur gear meshing with the worm gear; and a linkage system connected to the upper vehicle seat part and the lower vehicle seat part, the linkage system comprising a non-rotatable part providing second threads coacting with the first threads of the spindle shaft such that the linkage system positions vertically the upper vehicle seat part relative to the lower vehicle seat part in responsive to the position of the spindle shaft relative to the non-rotatable member of the linkage system, wherein at least one washer is provided on the spindle shaft and the spur gear is an over-molded gear embedding the at least one washer therein.

Preferably, the non-rotatable member of the linkage system is a tube with a nut fixed thereto, the spindle shaft extending through the nut and into the tube, inner threads of the nut forming said second threads Preferably, the linkage system further comprises a first link pivoted to one edge of the upper vehicle seat part and the lower vehicle seat part, a second link pivoted to an opposite edge of the upper vehicle seat part and the lower vehicle seat part, and a hook link with one end thereof being pivoted to the first link and the other end thereof fixed to the tube, a housing of the gearbox being pivotably connected to the upper vehicle seat part.

Preferably, the spindle shaft is provided with a neck part, and the at least one washer is provided on the neck part.

Preferably, the at least one washer comprises a plurality of washers, the spur gear embedding the plurality of washers therein, each washer comprising an annular split ring with an opening for fitting the ring to the spindle shaft.

Preferably, the openings of the plurality of washers are evenly distributed circumferentially.

Preferably, the at least one washer comprises a single annular split ring with an opening defined between two ends of the ring, and the ring is pinched onto the spindle shaft.

Preferably, the ring is plastically deformed to grip the spindle shaft and close the opening.

Preferably, a slot is formed in an inner edge of the ring diagonally opposite the opening.

Preferably, the at least one washer is made of steel and the spur gear is made of plastic.

Preferably, a pair of leaf springs bears against the spur gear and a wall of the gearbox.

According to a second aspect thereof, the present invention also provides a motor sub-assembly for a seat adjuster assembly, the motor sub-assembly comprising: an electric motor comprising an output shaft with a worm gear positioned in a gearbox; a spindle shaft providing first threads; a spur gear fixed to the spindle shaft, the spur gear meshing with the worm gear; and a non-rotatable member providing second threads coacting with the first threads of the spindle shaft such that the spindle shaft drives the non-rotatable member along the spindle shaft when the spindle shaft rotates, wherein at least one washer is provided on the spindle shaft and the spur gear is an over-molded gear embedding the at least one washer therein.

Preferably, the non-rotatable member is a tube with a nut fixed thereto, the spindle shaft extending through the nut and into the tube, inner threads of the nut forming said second threads Preferably, the spindle shaft is provided with a neck part, and the at least one washer is provided on the neck part.

Preferably, the at least one washer comprises a plurality of washers, the spur gear embedding the plurality of washers therein, each washer comprising an annular split ring with an opening for fitting the ring to the spindle shaft.

Preferably, the openings of the plurality of washers are evenly distributed circumferentially.

Preferably, the at least one washer comprises a single annular split ring with an opening defined between two ends of the ring, and the ring is pinched onto the spindle shaft.

Preferably, the ring is plastically deformed to grip the spindle shaft and to narrow the opening.

Preferably, a slot is formed in an inner edge of the ring diagonally opposite the opening.

Preferably, the at least one washer is made of steel and the spur gear is made of plastic.

Preferably, a pair of leaf springs bears against the spur gear and a wall of the gearbox.

According to a third aspect thereof, the present invention also provides a seat adjuster assembly for adjusting a vertically movable upper vehicle seat part relative to a non-vertically movable lower vehicle seat part, the seat adjuster assembly comprising: an electric motor having an output shaft and a worm gear positioned in a gearbox; a spur gear meshing with the worm gear; a spindle shaft fixed to and driven by the spur gear, the spindle shaft having first threads; and a linkage system connected to the upper vehicle seat part and the lower vehicle seat part, the linkage system comprising a non-rotatable member having second threads engaging with the first threads of the spindle shaft such that the linkage system positions vertically the upper vehicle seat part in responsive to the position of the spindle shaft relative to the non-rotatable member, wherein two leaf springs are disposed within the gearbox and bear against the spur gear and a wall of the gearbox.

Preferably, the non-rotatable member of the linkage system is a tube with a nut fixed thereto, the spindle shaft extends through the nut and into the tube, and inner threads of the nut form said second threads.

Preferably, the linkage system comprises a first link pivoted to one edge of the upper vehicle seat part and the lower vehicle seat part, a second link pivoted to an opposite edge of the upper vehicle seat part and the lower vehicle seat part, and a hook link with one end thereof being pivoted to the first link and the other end thereof fixed to the tube, a housing of the gearbox being pivotably connected to said opposite edge of the upper vehicle seat part.

Preferably, at least one washer is provided on the spindle shaft, the spur gear embedding the washers therein.

Preferably, the at least one washer comprises a single annular split ring with an opening defined between two ends of the ring, and the ring is pinched onto the spindle shaft.

Alternatively, the at least one washer comprises a plurality of washers, the spur gear embedding the plurality of washers therein, each washer comprising an annular split ring with an opening for fitting the ring to the spindle shaft.

BRIEF DESCRIPTION OF THE DRAWINGS

Preferred embodiments of the invention will now be described, by way of example only, with reference to figures of the accompanying drawings, in which.

DESCRIPTION OF THE PREFERRED EMBODIMENT

The present invention relates to a seat adjuster assembly for an automobile seat wherein a motor drives a spindle shaft via a gearbox. The spindle shaft coacts with a nut contained in a tube which in turn is connected to a linkage connected to a vertically movable upper part of a vehicle seat and to a non-vertically movable lower part of the vehicle seat to cause the seat to move up or down under the control of a passenger occupying that seat to obtain a comfortable position. The lower part of the seat is slidingly mounted in guide rails fixed to the vehicle frame so that the seat can be positioned fore and aft. This is a known concept of the prior art.

The assembly of components is illustrated in FIGS. 1 to 4. A link 1 is pivoted by pin 10 at one end to one edge of the vertically movable upper seat part 12, the portion of the seat that the passenger occupies, and at its other end by pin 17 to one end of a hook-link 14. At an intermediate position, link 1 is pivoted to the non-vertically movable lower seat part or seat frame part 20 by pin 16. Seat part 20 is guided on rails (not shown) that are attached to the vehicle frame to enable the seat to be adjusted fore and aft in a known manner. One end of a second link 2 is pivoted by pin 18 to the opposite edge of the upper seat part 12 with its other end pivoted to the non-vertically movable lower seat part by pin 22. The housing of the motor 30 and gearbox housing 32 is pivotably connected to the upper seat part 12 by a pin 19 to form a triangular linkage system.

Figure 1:
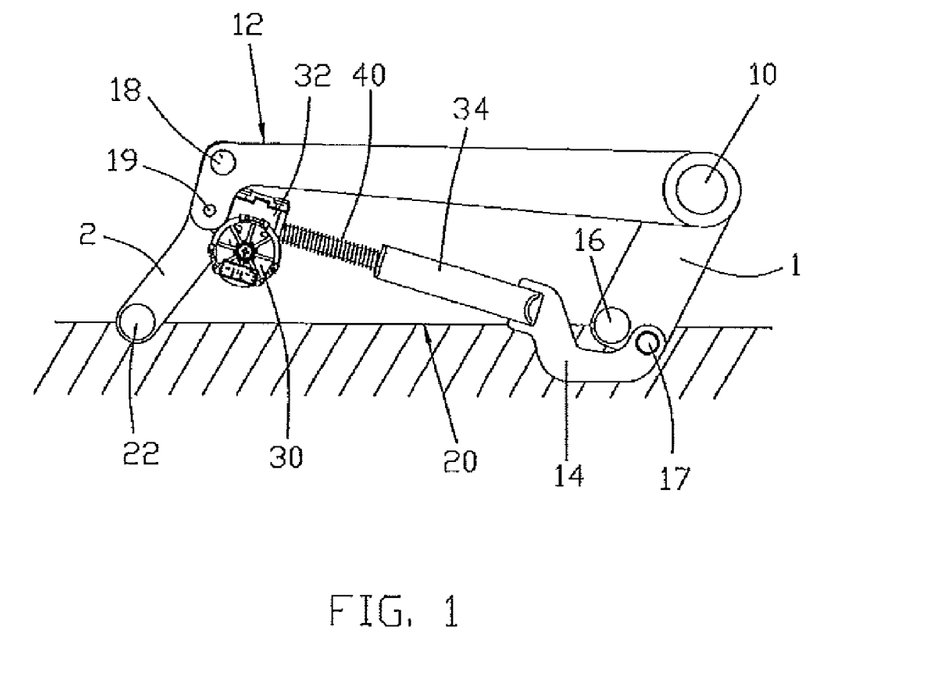
FIG. 1 shows the structural components involved in the assembly for lifting the seat and their relative juxtapositions when the seat has been shifted to its up position.
Figure 2:
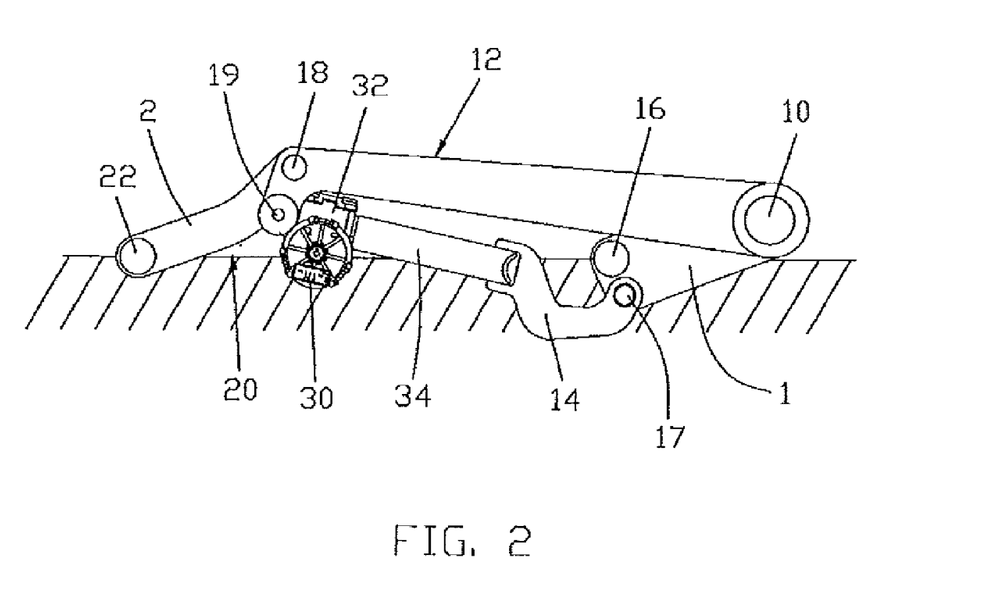
FIG. 2 shows the structural components involved in the assembly for controlling the seat and their relative juxtapositions when the seat has been shifted to its down position.
Figure 3:
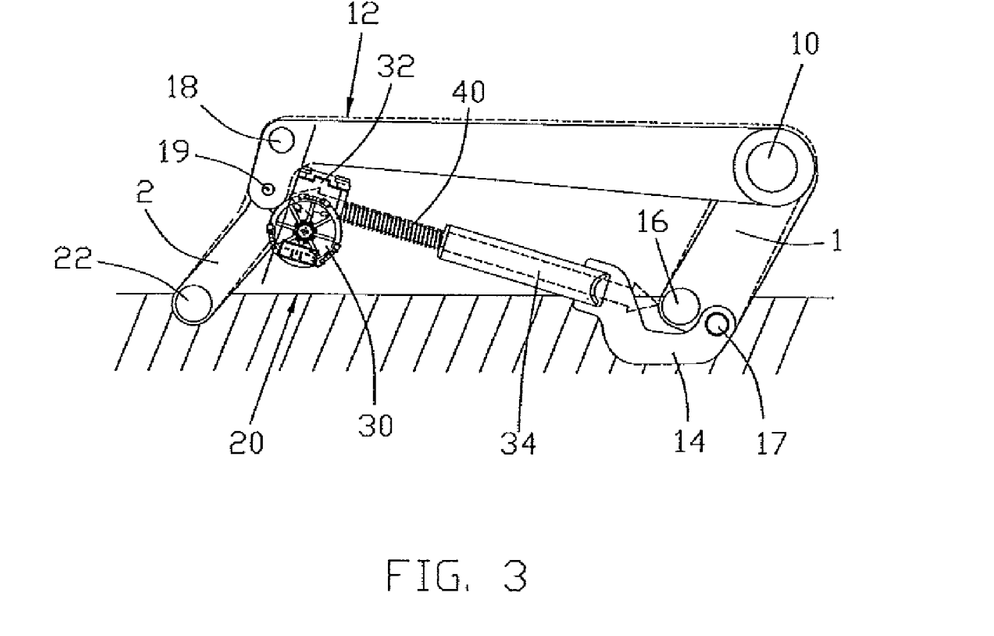
FIG. 3 illustrates how axial play of the motor can result in a little movement of the seat while the automobile is in motion, thereby imparting discomfort to the person occupying the seat.
Figure 4:
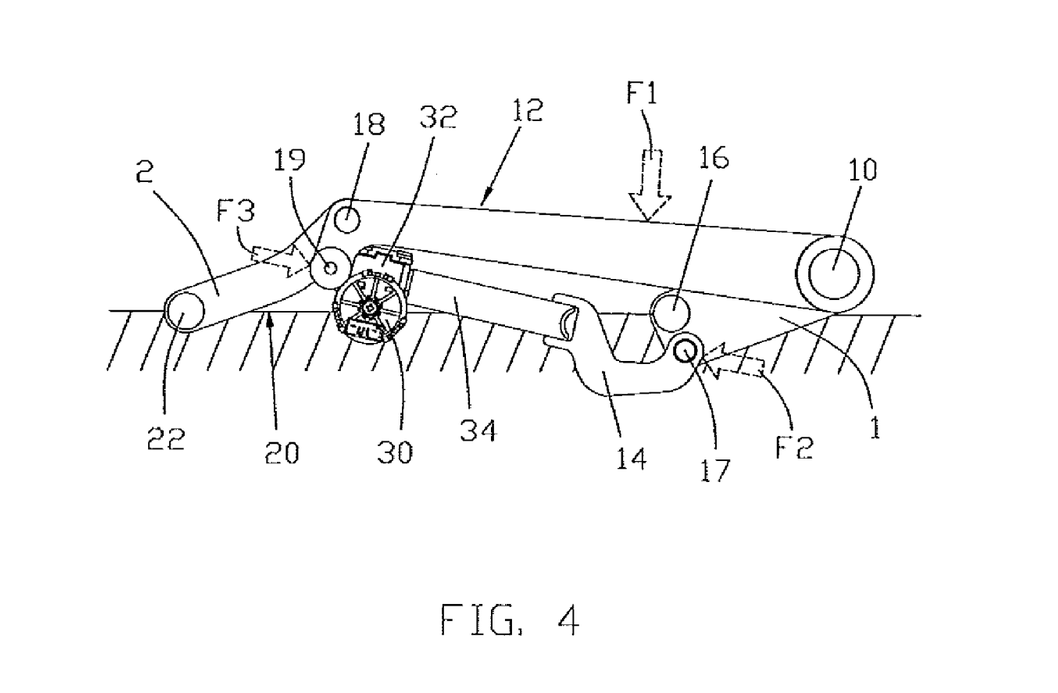
FIG. 4 illustrates how a large force to the seat results in a large force to the motor shaft, up to 18 k Newton in event of an accident (crash)

Links 1 and 2 support the vertically movable upper seat part 12 on the non-vertically movable lower seat part 20 with a motor assembly interconnecting link 1 and the upper seat part 12. By changing the distance between pin 17 and pin 19, the seat height is determined.

Figure 5:
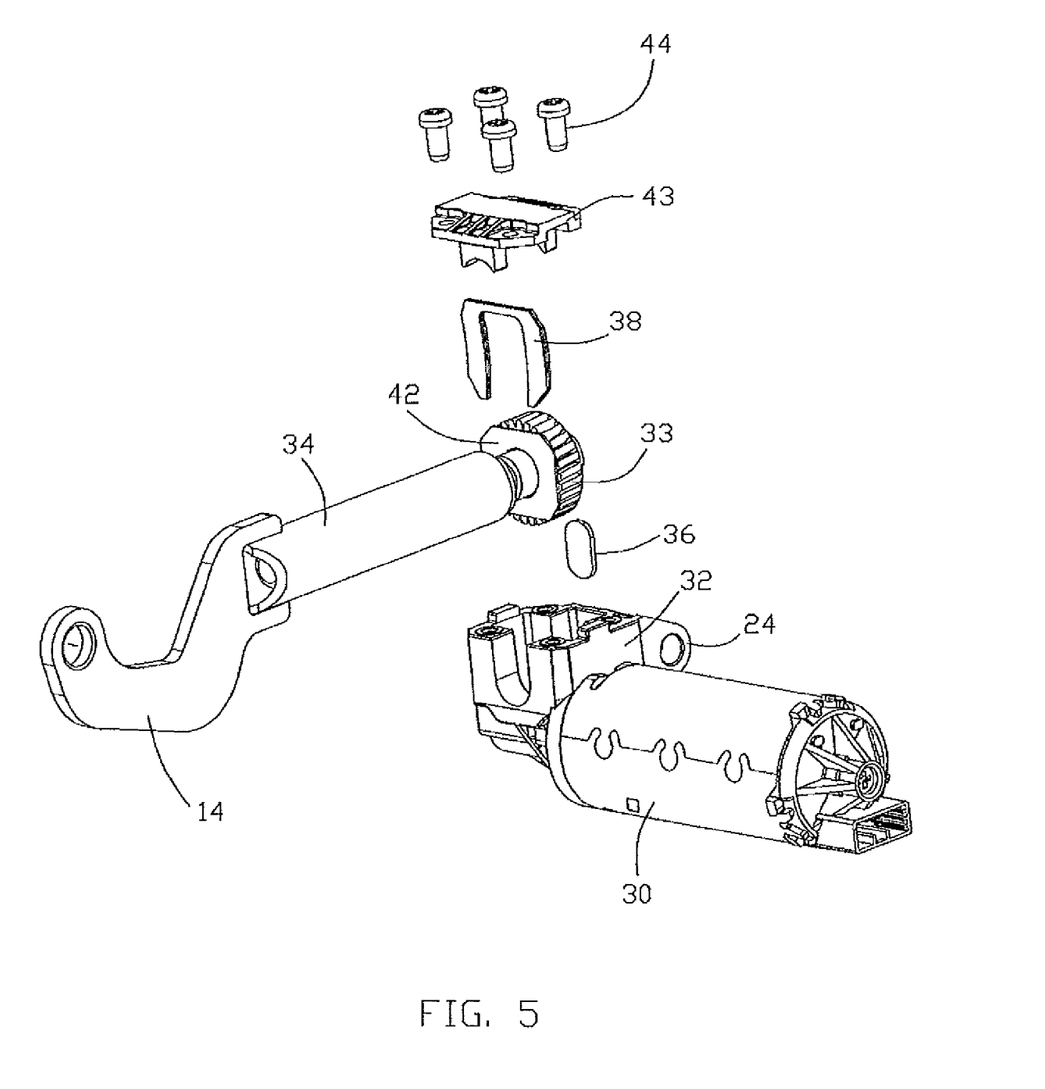
FIG. 5 is an exploded view of the invention showing the assembly of parts related to the motor output shaft.
Figure 6:
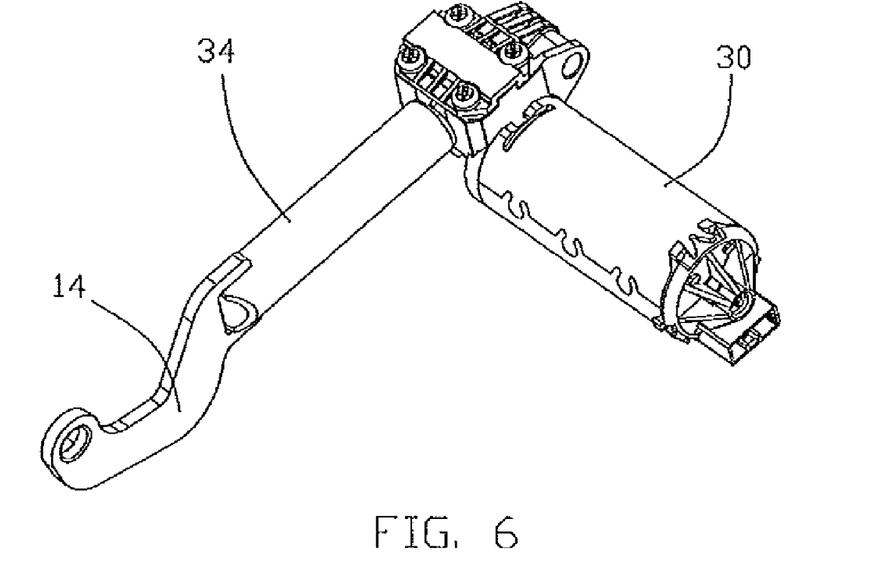
FIG. 6 shows the parts shown in FIG. 5 assembled.
Figure 7:
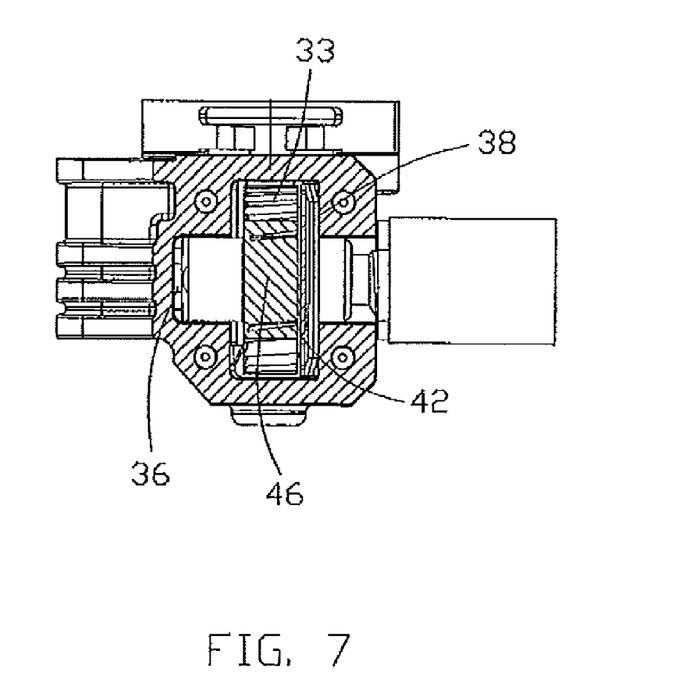
FIG. 7 is a view through the gear box of the assembly shown in FIG. 6.
Figure 8:
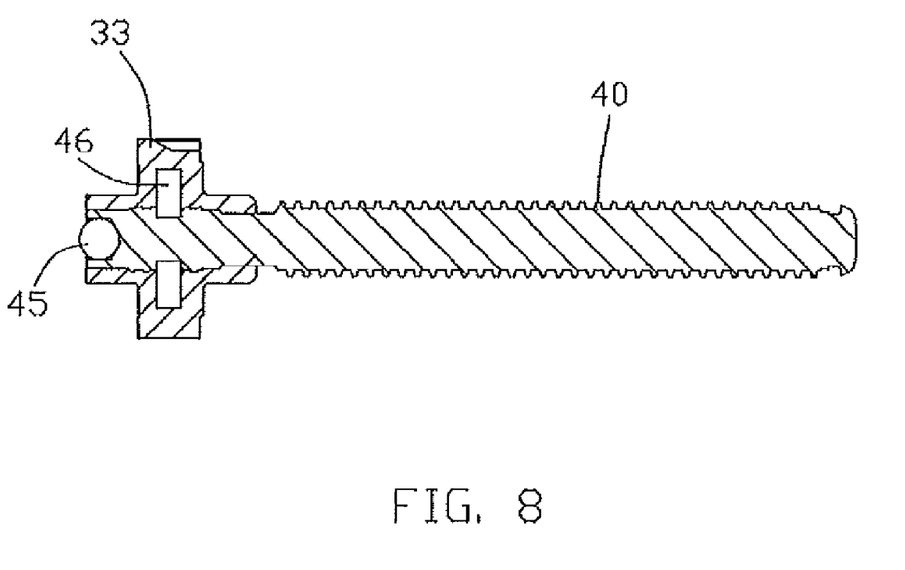
FIG. 8 is a diagrammatic view showing the output threaded shaft with a novel washer pinched onto the shaft at one end and integrated or embedded into an over-molded plastic gear.

The motor assembly for the seat adjuster is shown in FIGS. 5 to 7. FIG. 5 is an exploded view of the motor assembly, FIG. 6 is an assembled view and FIG. 7 is a partial sectional view of the gearbox. The motor assembly comprises an electric motor 30 integrally mounted with a gearbox housing 32. The motor output shaft has a worm gear 70 that terminates inside the gearbox housing 32. A spur gear 33 meshes with the worm gear 70 inside the gearbox housing 32. Spur gear 33 is an over-molded plastic gear embedding at least one washer 46 provided on a necked portion of the spindle shaft 40. The over-molded gear 33 has axially projections at its hub that extend over the juxtaposed portions of the shaft 40. The spindle shaft 40 is mounted for relative movement within tube 34 to be described in greater detail hereinafter. A bearing plate 36 fits into the gearbox housing 32 to receive the free end of the spindle shaft 40. A U-shaped spring sub-assembly 38, consisting of two springs, fits around the spindle shaft 40, bears against a spacer plate 42 lying against the over-molded plastic spur gear 33 within the gearbox 32. The gearbox 32 has a cover 43 that is fixed with 4 self-tapping screws 44. The other end of tube 34 is fixed to the other end of the link 14 such that the tube 34 is non-rotatable when the spindle shaft 40 is rotated in the tube 34. FIG. 8 shows diagrammatically the mounting of the over-molded plastic gear 33 on the spindle shaft 40. A master steel ball 45 is fitted into the end of the spindle shaft 40 for measuring position. The steel ball also reduces contact friction between the end of the spindle shaft and the bearing plate 36.

Figure 9:
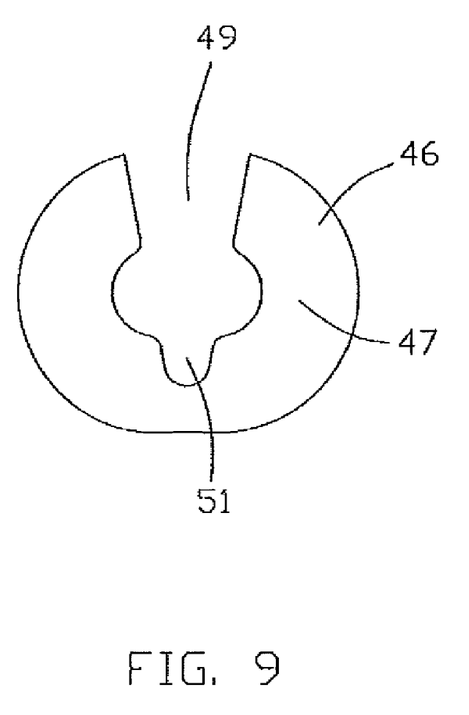
FIG. 9 is a face view of the washer pinched onto the shaft.
Figure 10:
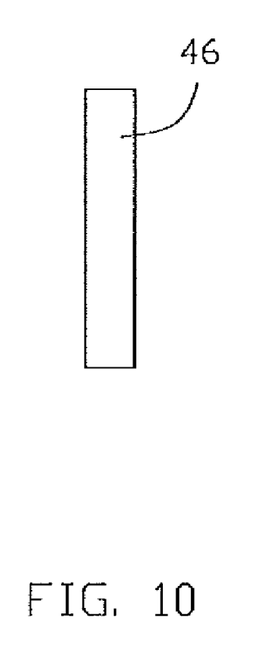
FIG. 10 is an edge view of the washer.

FIGS. 9 and 10 show the washer 46 that is provided on the spindle shaft 40 according to a first embodiment of the present invention. A single washer 46 is pinched onto a necked portion of the spindle shaft to securely hold the washer in place during over-molding and to accept the axial loading of the spindle shaft. The washer 46 is a disc made of steel and consists of an annular split ring 47 with an opening 49 defined between two ends of the ring 47. Diametrically opposite the opening 49 is a slot 51 formed in the inner edge of the annular ring. The washer 46 is assembled onto a neck part, slightly diameter reduced section, of the spindle shaft 40, and then, the washer 46 is over-molded with the plastic gear 33. During assembly of the washer to the spindle shaft, the shaft is moved through the opening until the shaft is located within the annulus of the split ring. The washer is then squeezed or compressed to pinch the washer on to the shaft. In so doing the washer is plastically deformed so that the annulus grips the shaft and the opening is narrowed or closed. The slot 51 assists in allowing the washer to be plastically deformed to be pinched onto the spindle shaft by reducing the force required and controlling the zone of deformation. The washer is so shaped that after being pinched onto the spindle shaft, the outer surface is substantially circular and concentric with the spindle shaft. This provides a uniform surface for the over-molding of the spur gear 33 thus allowing a better quality of molding. The narrowing or closing of the opening reduces the influence of the opening on the over-molded gear. The washer 46 when pinched to the spindle 40 has an outer diameter that is almost concentric to the gear inner diameter and this keeps the gear dimension accurate. Washer 46 receives a huge axial force from the spindle threaded shaft 40. The plastic gear 33 cannot, by itself, withstand such a force. Because the washer is made of steel and acts like a bone inside the plastic gear 33, the washer 46 with the over-molded gear 33 can receive a large axial force imposed on the spindle hook sub-assembly, and thus, the combination of the washer 46 and over-molded gear 33 is able to withstand the force.

Figures 11, 12, 13:
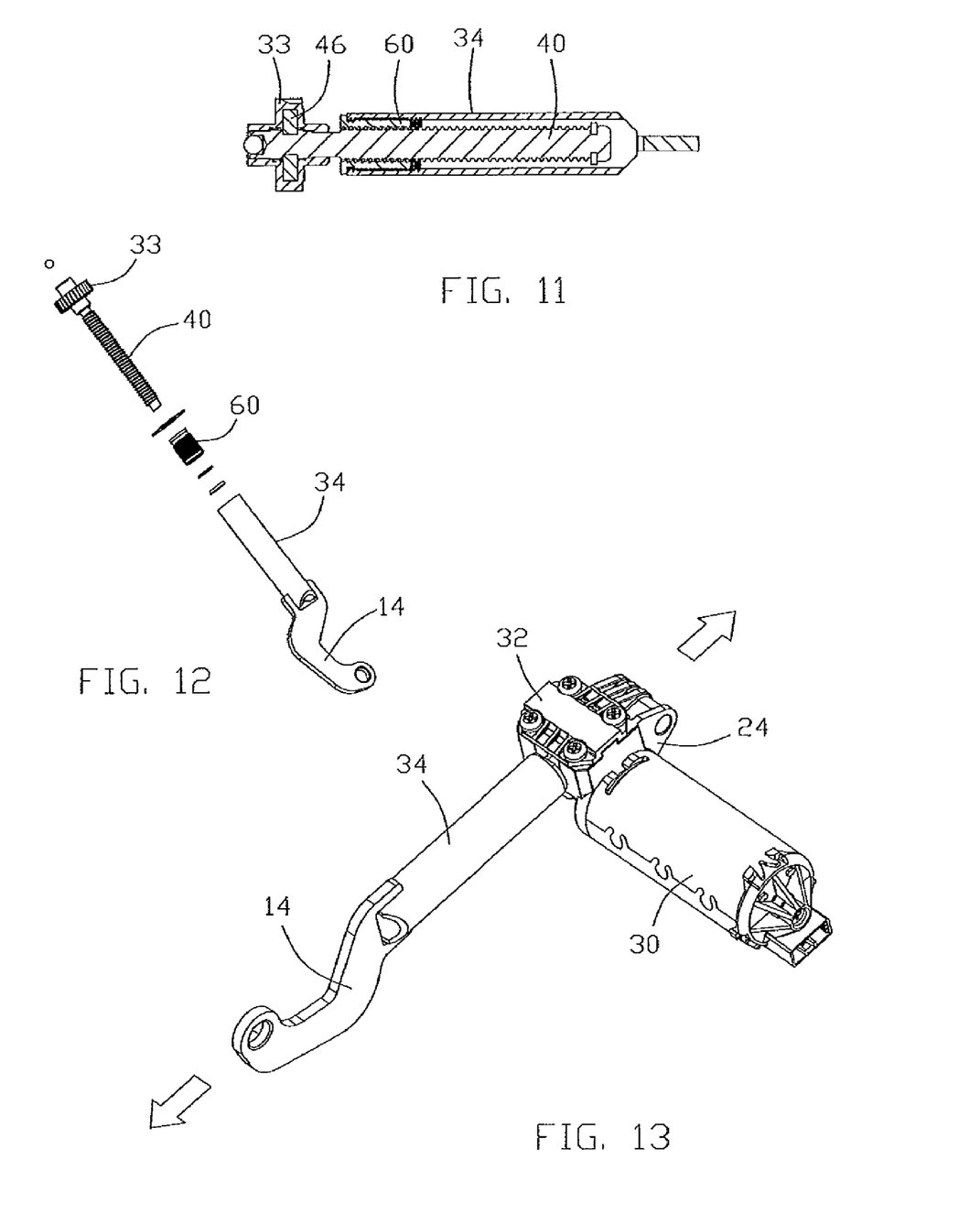
FIG. 11 is a diagrammatic view of the output spindle shaft sub-assembly.
FIG. 12 is an exploded view of the output spindle shaft sub-assembly.
FIG. 13 is a diagrammatic view showing the huge force generated from the thread on the spindle shaft.

FIGS. 11 and 12 show the spindle hook sub-assembly in greater detail. As will be evident from the foregoing description, the nut 60 is fixed within the tube 34 and engaged with the threads of the spindle shaft 40. FIG. 13 shows the assembled spindle hook sub-assembly and in particular, the flange 24 which is used to pivotably connect the motor and gearbox housing 32 to pin 19.

Figure 14:
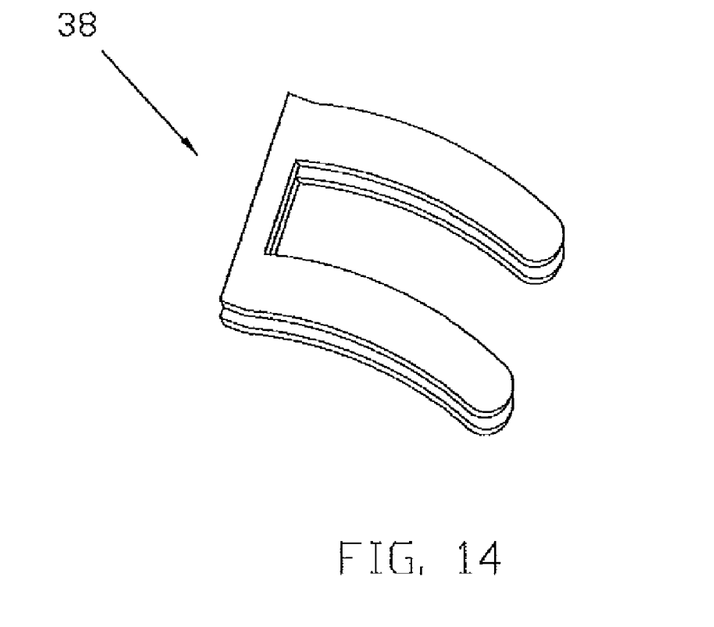
FIG. 14 is a top view of the novel spring arrangement used to constrain axial movement of the spindle shaft.
Figure 15:
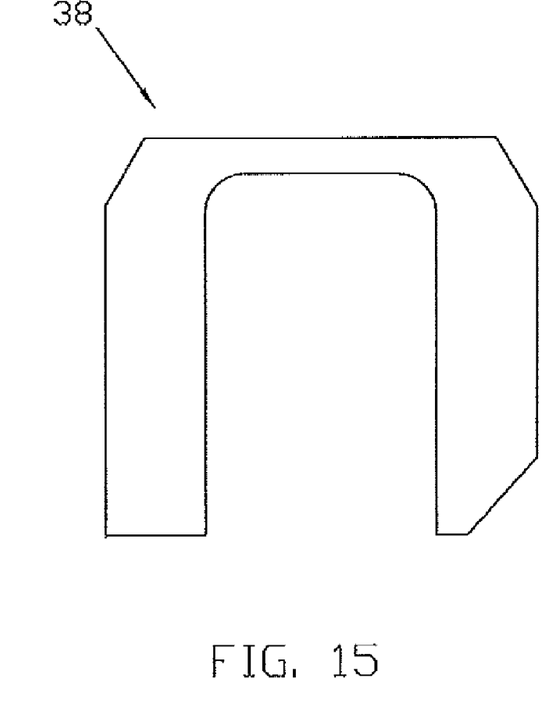
FIG. 15 is a face view of the spring.
Figure 16:
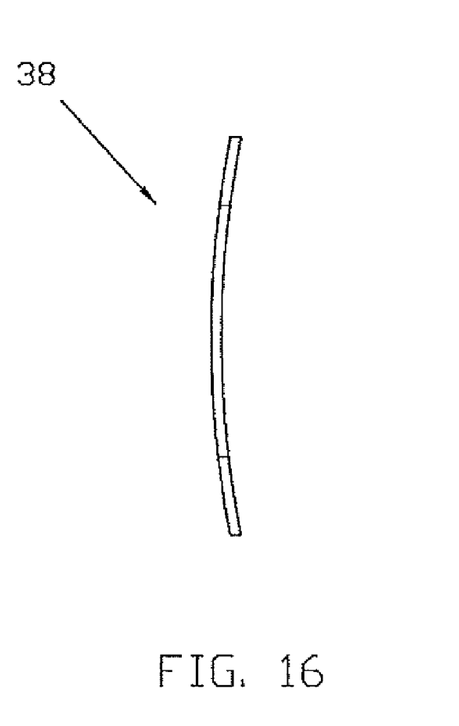
FIG. 16 is an edge view of the spring.

Referring back to FIGS. 3 and 4, if there is axial play of the spindle hook sub-assembly, there will be relative movement between the seat parts which is uncomfortable for the passenger and gives the perception of poor quality. To remove this axial play a spacer plate 42 is fitted against the side of the over-molded plastic gear 33 and a pair of steel springs 38 is inserted around the spindle shaft 40 between the spacer plate 42 and the wall of the gearbox 32, as shown in FIG. 5. The springs 38 are U-shaped as shown in FIGS. 14 to 16 and have a tensile strength of greater than $1200N/mm^2$.

The setting force requirement and the stress level on the burr-free springs 38 is very high, and therefore, it is necessary to use a pair of springs or a stack of springs. As explained, using a DC motor threaded driving spindle shaft 40 that engages with a nut 60 fixed in the tube 34 with the relative position of the shaft 40 and nut 60 determining seat height position produces a considerable force. By using the stacked springs (pair of springs 38) it was possible to achieve no perceptible seat back "chuck", which if experienced would be perceived as poor quality. The use of the stacked arrangement of springs 38 also protected against spring fatigue in the small packaging space inside the gearbox 32. Overall, the use of the stacked U-shaped leaf springs 38 had unexpectedly good results in the motor driving system for setting and maintaining the vehicle seat position. In a particular application, illustrated in FIG. 14, the springs 38 were about 30 mm in height with a curvature of about 36 degrees giving a free height of about 2 mm, see FIG. 16. The springs were about 0.8 mm thick and the legs of the U were about 7.5 mm wide. The edges were beveled as shown in FIG. 15. The spring force achieved was greater than 100N when compressed into 1.5 mm from free height, thus greater than 50N per spring. The springs 38 withstood both compression and flattening testing with tolerant deformation.

Figure 17:
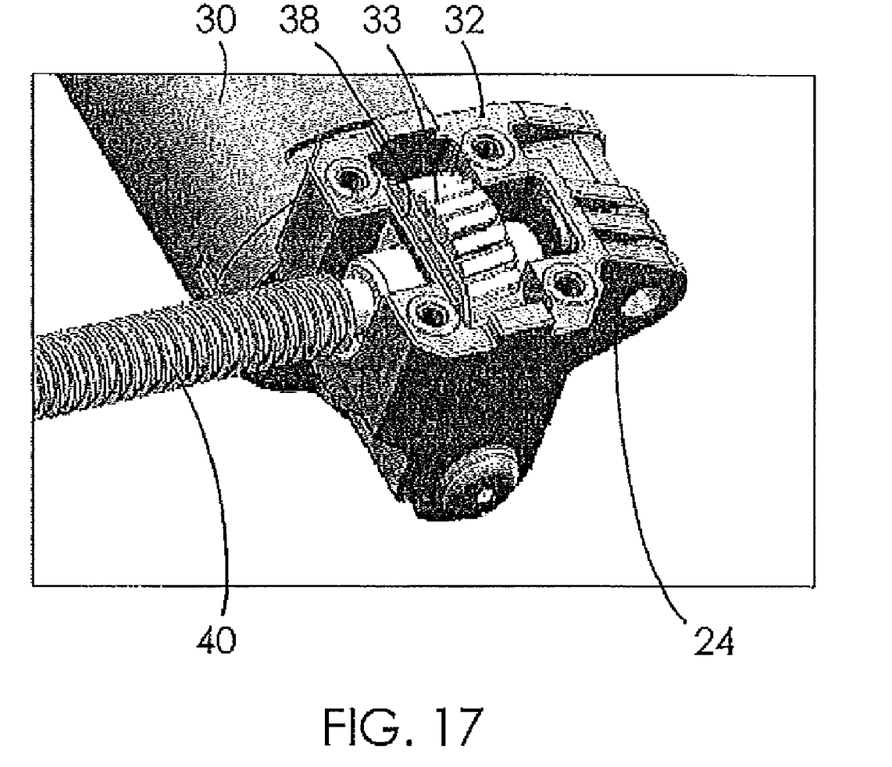
FIG. 17 is a diagrammatic view showing the gearbox arrangement.
Figure 18:
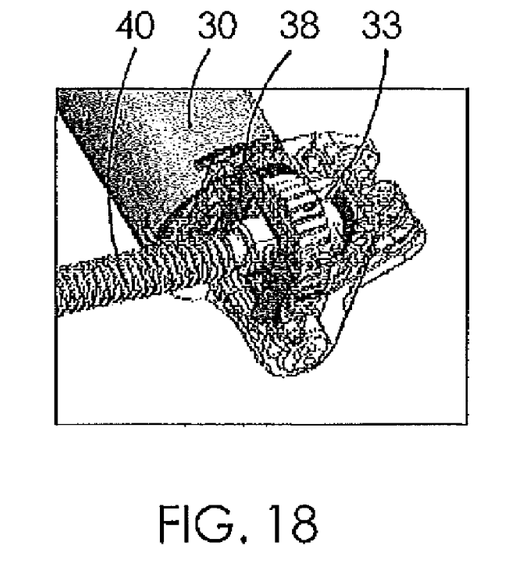
FIG. 18 is a view similar to FIG. 17 with parts transparent to show details of the assembly within the gearbox.

FIGS. 17 and 18 show in greater detail the assembled spindle shaft 40 within the gearbox 32, illustrating the position of the leaf springs 38 between the gear 33 and the wall of the gearbox 32. As noted the function of the leaf springs 38 is to cancel free axial movement of the motor spindle shaft 40.

Figure 19:
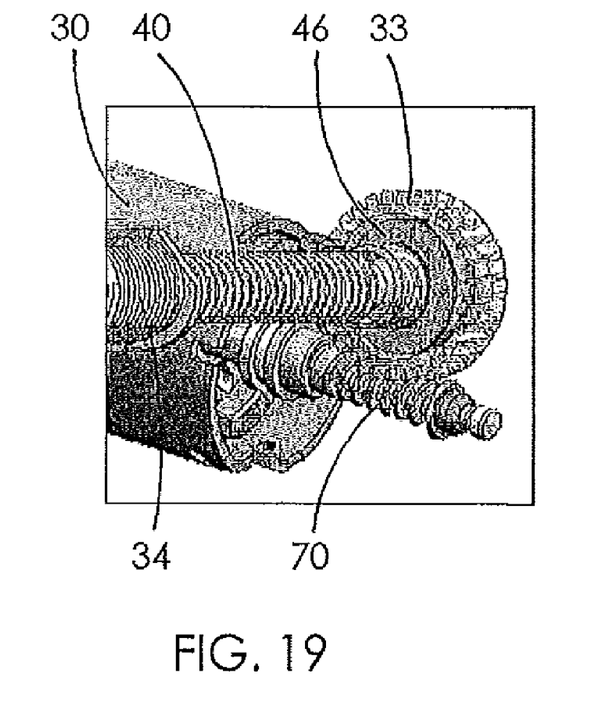
FIG. 19 is a diagrammatic view showing the washer inside the over-molded plastic gear.
Figure 20:
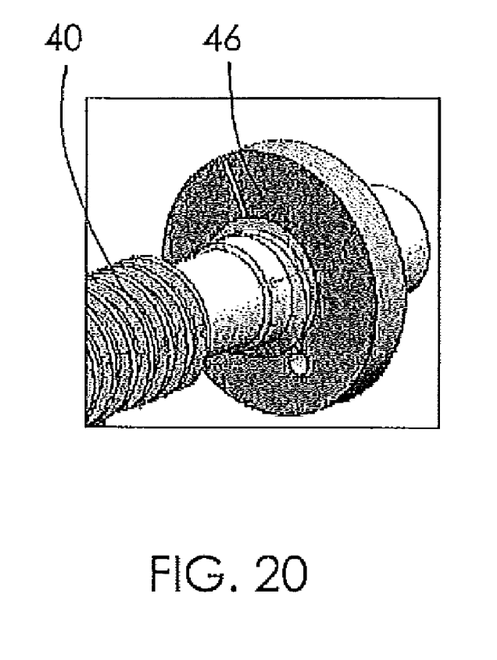
FIG. 20 shows the washer pinched onto the shaft before being over-molded with the plastic gear.
Figure 21:
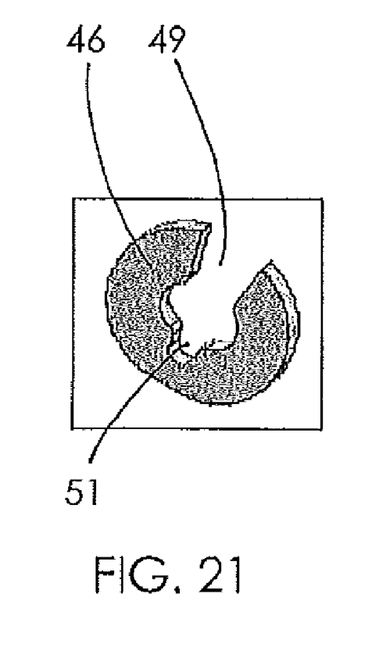
FIG. 21 is a perspective view of the washer before being pinched onto the shaft.

FIGS. 19 to 21 show in greater detail the washer 46 inside the over-molded gear 33 and the meshing of the plastic gear 33 with the worm gear 70 on the output shaft of the electric motor 30. FIG. 20 shows the washer 46 pinched onto the shaft 40 prior to over-molding of the plastic gear 33. As can be seen, the opening has been narrowed so as to be substantially closed. FIG. 21 shows the washer 46 prior to being pinched onto the shaft 40.

Figure 22:
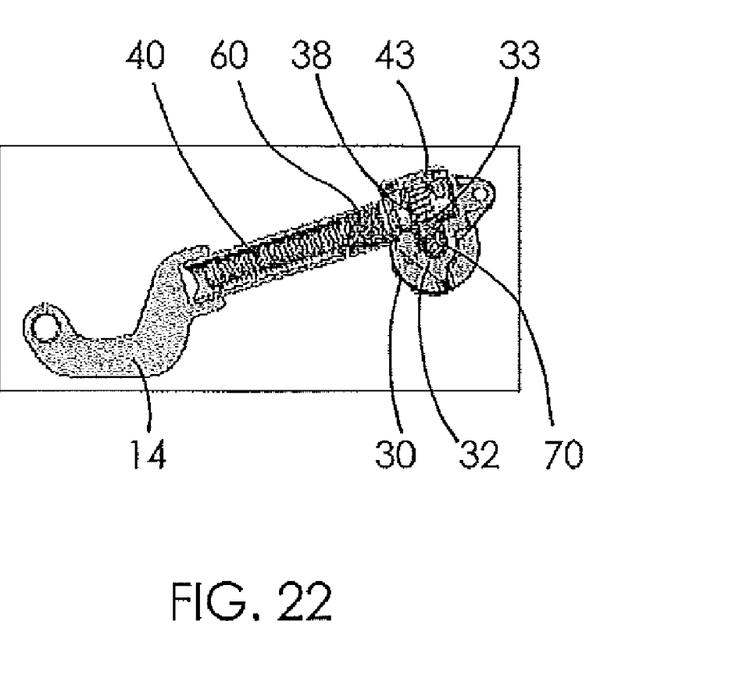
FIG. 22 is a diagrammatic view of the overall assembly showing the spindle shaft fully withdrawn into the tube, corresponding to the seat down position.
Figure 23:
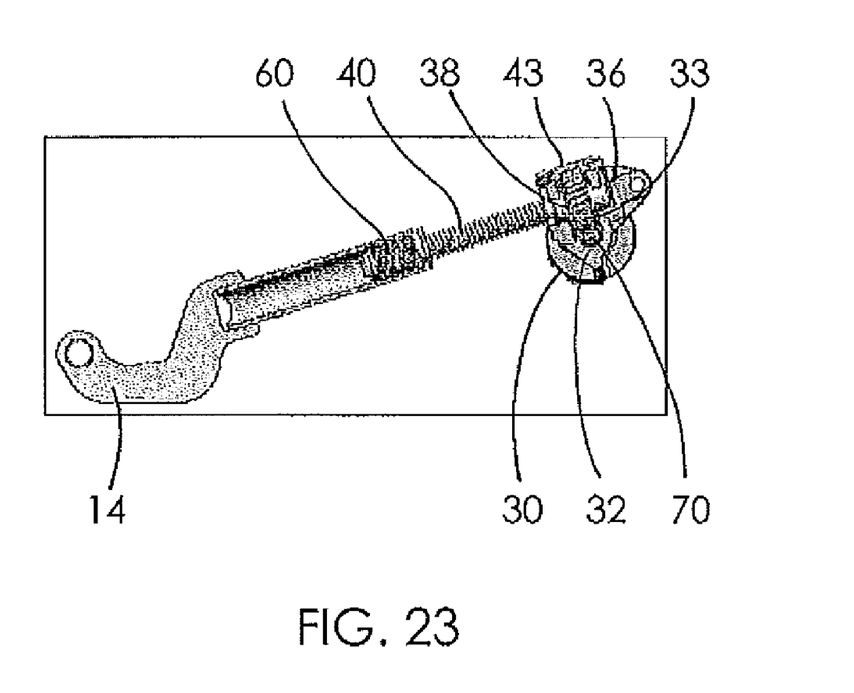
FIG. 23 is a diagrammatic view of the overall assembly showing the spindle shaft fully extended from the tube, corresponding to the seat up position.

FIGS. 22 and 23 show, respectively, the interaction of the assembly as the motor 30 rotates. When the motor 30 is operated to rotate the spindle shaft 40, the nut 60 together with the tube 34 moves along the shaft 40 to change the length between pin 17 and pin 19. In FIG. 22, the shaft 40 is shown totally within the tube 34 and the distance between pin 17 and pin 19 is the shortest, therefore, the seat is in the seat down position. In FIG. 23, the shaft 40 is shown fully extended from the tube 34 and the distance between pin 17 and pin 19 is the greatest, therefore, the seat is in the seat up position.

Figure 24A:
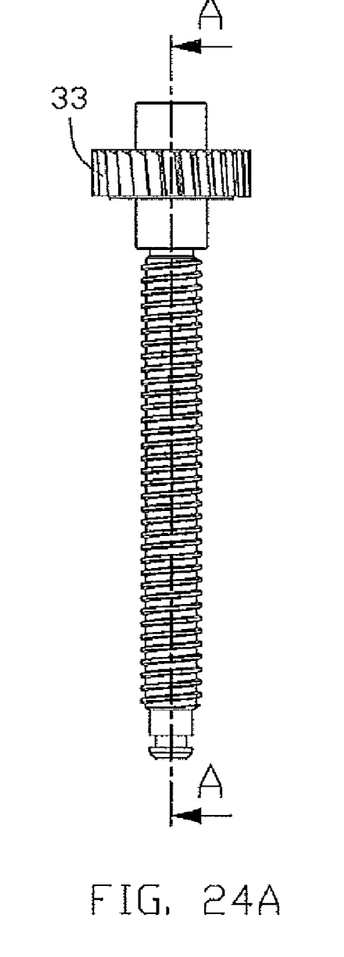
FIG. 24A is a side view of the shaft and washers in accordance with an alternative embodiment of the present invention.
Figure 24B:
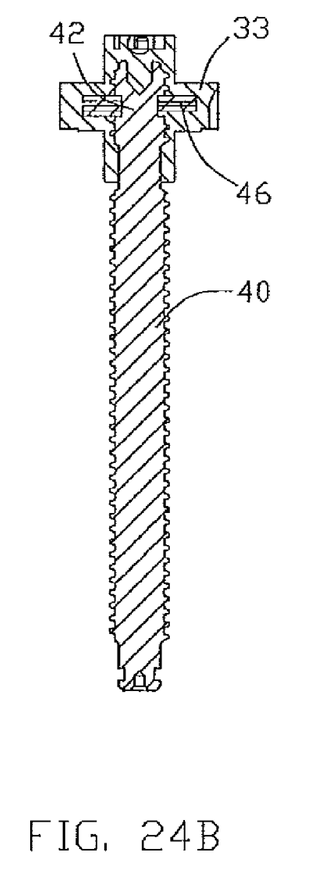
FIG. 24B is a cross-sectional view of FIG. 24A taken along the line A-A.
Figure 24C:
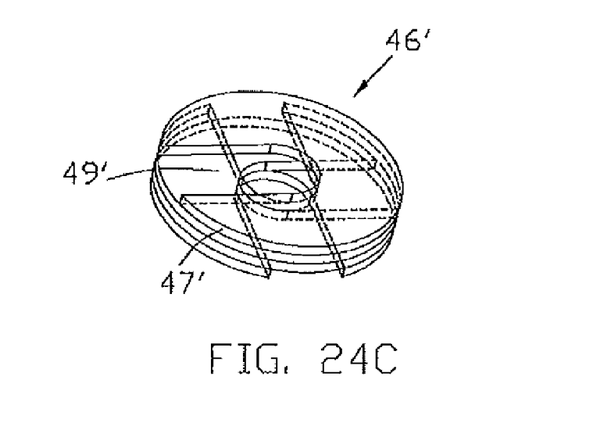
FIG. 24C is a diagrammatic view showing the stacked washers of FIG. 3A.

A second embodiment is shown in FIGS. 24A, 24B and 24C, in which four washers 46' are provided on the neck part of the spindle shaft 40 and the gear 33 is molded over the four washers 46'. Each washer 46' is a steel annular split ring 47' with a U-shaped opening 49' extending in radial direction thereof. The opening 49' has a semi-circular end configured for contacting the spindle shaft 40. When all of the washers 46' are stacked on the neck part of the shaft 40, the openings 49' of the washers 46' are distributed, preferably symmetrically, in the circumferential direction of the washers and the semi-circle ends of the openings 49' are concentric with the shaft 40. The openings 49' of each washer 46' are closed by the rings or body portions of the other washers 46' in the axial direction, which improves the anti-deforming capability of the washers 46' greatly. It also provides the washers with a uniform outer circumference on which the spur gear is molded, to improve the quality of the molding.

Figure 25A:
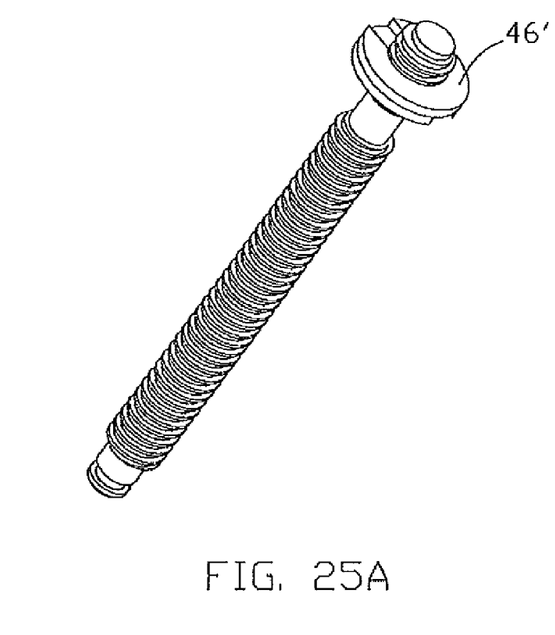
FIG. 25A is a diagrammatic view showing the spindle shaft and washers in accordance with another alternative embodiment of the present invention.
Figure 25B:
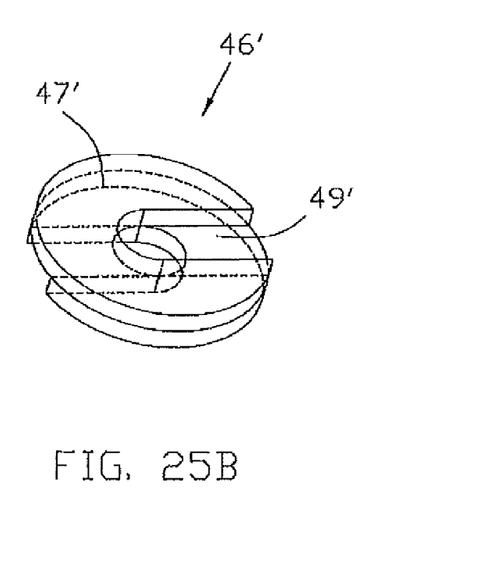
FIG. 25B is a diagrammatic view showing the stacked washers of FIG. 25A.

A further embodiment of the present invention is shown in FIGS. 25A and 25B, in which two washers 46' are provided on the neck part of the spindle shaft 40 and the gear 33 is molded over the two washers 46'. The U-shaped openings 49' of the washers 46' are distributed, preferably at an angle of 180 degrees to each other.

Figure 26A:
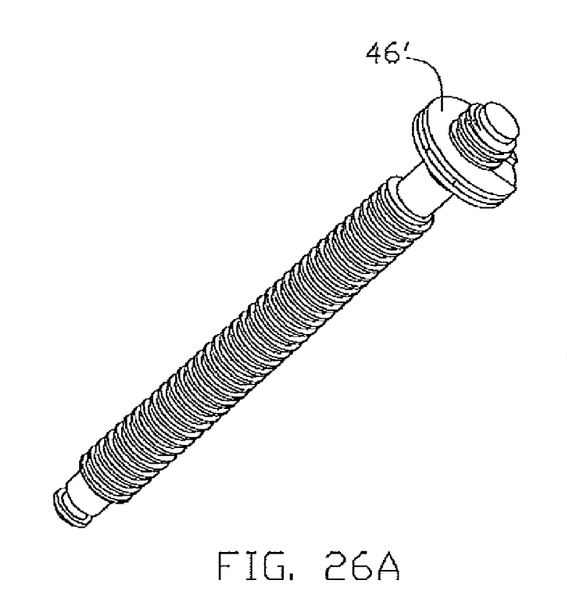
FIG. 26A is a diagrammatic view showing the spindle shaft and washers in accordance with another further alternative embodiment of the present invention.
Figure 26B:
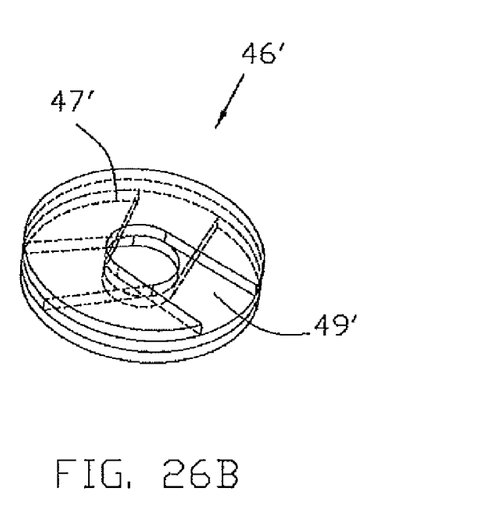
FIG. 26B is a diagrammatic view showing the stacked washers of FIG. 26A.

Another embodiment of the present invention is shown in FIGS. 26A and 26B, in which three washers 46' are provided on the neck part of the spindle shaft 40 and the gear 33 is molded over the three washers 46'. The U-shaped openings 49' of the washers 46' are distributed, preferably at an angle of 120 degrees to each other.

It is to be understood that, in the above embodiments, the quantity of the washers 46 can be N, and the U-shaped openings 49' of the washers 46' are distributed at an angle of 360/N degrees to each other, wherein N is an integer larger than or equal to 1. Understandably, the greater N is, the greater axial force the combination of the washer 46' and over-molded gear 33 is able to withstand. The circumferential distribution of the openings may not be strictly uniform but it is desirable that no two openings are aligned in the axial direction.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

What is claimed is:

1. A seat adjuster assembly for adjusting a vertically movable upper vehicle seat part relative to a non-vertically movable lower vehicle seat part, the seat adjuster assembly comprising:

an electric motor comprising an output shaft with a worm gear positioned in a gearbox;
a spindle shaft providing first threads;
a spur gear fixed to the spindle shaft, the spur gear meshing with the worm gear; and
a linkage system connected to the upper vehicle seat part and the lower vehicle seat part, the linkage system comprising a non-rotatable member providing second threads coacting with the first threads of the spindle shaft such that the linkage system positions vertically the upper vehicle seat part relative to the lower vehicle seat part in response to the position of the spindle shaft relative to the non-rotatable member of the linkage system, wherein at least one washer is provided on the spindle shaft and the spur gear is an over-molded gear embedding the at least one washer therein; and
wherein the non-rotatable member of the linkage system is a tube with a nut fixed thereto, the spindle shaft extending through the nut and into the tube, inner threads of the nut forming said second threads.

2. The seat adjuster assembly of claim 1, wherein the linkage system further comprises a first link pivoted to one edge of the upper vehicle seat part and the lower vehicle seat part, a second link pivoted to an opposite edge of the upper vehicle seat part and the lower vehicle seat part, and a hook link with one end thereof being pivoted to the first link and the other end thereof fixed to the tube, a housing of the gearbox being pivotably connected to the upper vehicle seat part.

3. The seat adjuster assembly of claim 1, wherein the spindle shaft is provided with a neck part, and the at least one washer is provided on the neck part.

4. A seat adjuster assembly for adjusting a vertically movable upper vehicle seat part relative to a non-vertically movable lower vehicle seat part, the seat adjuster assembly comprising:

an electric motor comprising an output shaft with a worm gear positioned in a gearbox;
a spindle shaft providing first threads;
a spur gear fixed to the spindle shaft, the spur gear meshing with the worm gear; and
a linkage system connected to the upper vehicle seat part and the lower vehicle seat part, the linkage system comprising a non-rotatable member providing second threads coacting with the first threads of the spindle shaft such that the linkage system positions vertically the upper vehicle seat part relative to the lower vehicle seat part in response to the position of the spindle shaft relative to the non-rotatable member of the linkage system, wherein at least one washer is provided on the spindle shaft and the spur gear is an over-molded gear embedding the at least one washer therein; and
wherein the at least one washer comprises a plurality of washers, the spur gear embedding the plurality of washers therein, each washer comprising an annular split ring with an opening for fitting the ring to the spindle shaft.

5. The seat adjuster assembly of claim 4, wherein the openings of the plurality of washers are evenly distributed circumferentially.

6. The seat adjuster assembly of claim 4, wherein the at least one washer is made of steel and the spur gear is made of plastic.

7. The seat adjuster assembly of claim 4, wherein a pair of leaf springs bears against the spur gear and a wall of the gearbox.

8. A seat adjuster assembly for adjusting a vertically movable upper vehicle seat part relative to a non-vertically movable lower vehicle seat part, the seat adjuster assembly comprising:
- an electric motor comprising an output shaft with a worm gear positioned in a gearbox;
- a spindle shaft providing first threads;
- a spur gear fixed to the spindle shaft, the spur gear meshing with the worm gear; and
- a linkage system connected to the upper vehicle seat part and the lower vehicle seat part, the linkage system comprising a non-rotatable member providing second threads coacting with the first threads of the spindle shaft such that the linkage system positions vertically the upper vehicle seat part relative to the lower vehicle seat part in response to the position of the spindle shaft relative to the non-rotatable member of the linkage system,
- wherein at least one washer is provided on the spindle shaft and the spur gear is an over-molded gear embedding the at least one washer therein; and
- wherein the at least one washer comprises a single annular split ring with an opening defined between two ends of the ring, and the ring is pinched onto the spindle shaft.

9. The seat adjuster assembly of claim 8, wherein the ring is plastically deformed to grip the spindle shaft and to close the opening.

10. The seat adjuster assembly of claim 9, wherein a slot is formed in an inner edge of the ring diagonally opposite the opening.

11. A motor sub-assembly for a seat adjuster assembly, the motor sub-assembly comprising:
- an electric motor comprising an output shaft with a worm gear positioned in a gearbox;
- a spindle shaft providing first threads;
- a spur gear fixed to the spindle shaft, the spur gear meshing with the worm gear; and
- a non-rotatable member providing second threads coacting with the first threads of the spindle shaft such that the spindle shaft drives the non-rotatable member along the spindle shaft when the spindle shaft rotates,
- wherein at least one washer is provided on the spindle shaft and the spur gear is an over-molded gear embedding the at least one washer therein, and
- wherein the non-rotatable member is a tube with a nut fixed thereto, the spindle shaft extending through the nut and into the tube, inner threads of the nut forming said second threads.

12. The motor sub-assembly of claim 11, wherein the spindle shaft is provided with a neck part, and the at least one washer is provided on the neck part.

13. A motor sub-assembly for a seat adjuster assembly, the motor sub-assembly comprising:
- an electric motor comprising an output shaft with a worm gear positioned in a gearbox;
- a spindle shaft providing first threads;
- a spur gear fixed to the spindle shaft, the spur gear meshing with the worm gear; and
- a non-rotatable member providing second threads coacting with the first threads of the spindle shaft such that the spindle shaft drives the non-rotatable member along the spindle shaft when the spindle shaft rotates,
- wherein at least one washer is provided on the spindle shaft and the spur gear is an over-molded gear embedding the at least one washer therein, and
- wherein the at least one washer comprises a plurality of washers, the spur gear embedding the plurality of washers therein, each washer comprising an annular split ring with an opening for fitting the ring to the spindle shaft.

14. The motor sub-assembly of claim 13, wherein the openings of the plurality of washers are evenly distributed circumferentially.

15. The motor sub-assembly of claim 13, wherein the at least one washer is made of steel and the spur gear is made of plastic.

16. The motor sub-assembly of claim 13, wherein a pair of leaf springs bears against the spur gear and a wall of the gearbox.

17. A motor sub-assembly for a seat adjuster assembly, the motor sub-assembly comprising:
- an electric motor comprising an output shaft with a worm gear positioned in a gearbox;
- a spindle shaft providing first threads;
- a spur gear fixed to the spindle shaft, the spur gear meshing with the worm gear; and
- a non-rotatable member providing second threads coacting with the first threads of the spindle shaft such that the spindle shaft drives the non-rotatable member along the spindle shaft when the spindle shaft rotates,
- wherein at least one washer is provided on the spindle shaft and the spur gear is an over-molded gear embedding the at least one washer therein, and
- wherein the at least one washer comprises a single annular split ring with an opening defined between two ends of the ring, and the ring is pinched onto the spindle shaft.

18. The motor sub-assembly of claim 17, wherein the ring is plastically deformed to grip the spindle shaft and to narrow the opening.

19. The motor sub-assembly of claim 18, wherein a slot is formed in an inner edge of the ring diagonally opposite the opening.

20. A seat adjuster assembly for adjusting a vertically movable upper vehicle seat part relative to a non-vertically movable lower vehicle seat part, the seat adjuster assembly comprising:
- an electric motor having an output shaft and a worm gear positioned in a gearbox;
- a spur gear meshing with the worm gear;
- a spindle shaft fixed to and driven by the spur gear, the spindle shaft having first threads; and
- a linkage system connected to the upper vehicle seat part and the lower vehicle seat part, the linkage system comprising a non-rotatable member having second threads engaging with the first threads of the spindle shaft such that the linkage system positions vertically the upper vehicle seat part in responsive to the position of the spindle shaft relative to the non-rotatable member,
- wherein two leaf springs are disposed within the gearbox and bear against the spur gear and a wall of the gearbox.

21. The seat adjuster assembly of claim 20, wherein the non-rotatable member of the linkage system is a tube with a nut fixed thereto, the spindle shaft extends through the nut and into the tube, inner threads of the nut forming said second threads.

22. The seat adjuster assembly of claim 21, wherein the linkage system comprises a first link pivoted to one edge of the upper vehicle seat part and the lower vehicle seat part, a second link pivoted to an opposite edge of the upper vehicle seat part and the lower vehicle seat part, and a hook link with one end thereof being pivoted to the first link and the other end thereof fixed to the tube, a housing of the gearbox being pivotably connected to said opposite edge of the upper vehicle seat part.

23. The seat adjuster assembly of claim 20, wherein at least one washer is provided on the spindle shaft, the spur gear embedding the washers therein.

24. The seat adjuster assembly of claim 23, wherein the at least one washer comprises a single annular split ring with an opening defined between two ends of the ring, and the ring is pinched onto the spindle shaft.

25. The seat adjuster assembly of claim 23, wherein the at least one washer comprises a plurality of washers, the spur gear embedding the plurality of washers therein, each washer comprising an annular split ring with an opening for fitting the ring to the spindle shaft.

* * * * *